United States Patent [19]

Johnson et al.

[11] 4,177,551

[45] Dec. 11, 1979

[54] METHOD OF WELDING A ARC BATTERY INTERCELL CONNECTOR

[75] Inventors: George S. Johnson, Anderson; Robey C. Reff, Muncie, both of Ind.

[73] Assignee: General Motors Corporation, Detroit, Mich.

[21] Appl. No.: 944,257

[22] Filed: Sep. 21, 1978

[51] Int. Cl.$^2$ .......................... H01M 2/24; B23P 9/16
[52] U.S. Cl. ................................. 29/623.1; 429/160; 219/137 R; 219/75; 403/270
[58] Field of Search ................... 29/623.1, 623.2, 730, 29/731; 429/160, 158; 219/137 R, 75; 403/270, 271, 272; 228/901

[56] References Cited

U.S. PATENT DOCUMENTS

| | | | |
|---|---|---|---|
| 2,942,055 | 6/1960 | Doyle et al. | 429/160 |
| 3,001,058 | 9/1961 | Faber et al. | 219/137 R |
| 3,313,658 | 4/1967 | Sabatino et al. | 429/160 |
| 3,589,948 | 6/1971 | Adams | 29/623.1 |
| 3,767,889 | 10/1973 | Sano et al. | 219/137 R |
| 3,806,696 | 4/1974 | Young et al. | 219/137 R |
| 3,873,803 | 3/1975 | Young et al. | 219/75 |
| 4,037,077 | 7/1977 | Harder | 219/137 R |
| 4,046,062 | 9/1977 | Matter | 29/623.1 |

*Primary Examiner*—Daniel C. Crane
*Attorney, Agent, or Firm*—Lawrence B. Plant

[57] ABSTRACT

A method of forming a through-the-partition intercell connection between adjacent cell groups in a multicell, lead-acid storage battery. Plate strap lugs are positioned on either side of an aperture in a partition between adjacent cells. One of the lugs has a substantially flat face thereon abutting the partition while the other and opposing lug has a cavity formed in its partition-abutting face, which cavity is substantially axially aligned with the aperture during positioning. The battery is rotated 90° such that the cavity-bearing lug lies beneath the flat-faced lug. The flat-faced lug is then arc welded through its center backside such that the melt formed flows by gravity through the aperture in the partition and into the cavity in the opposing lug. After the battery is inverted and the center backside of the cavity-bearing lug arc welded to fuse the lugs together, cold pressing the lugs together completes the connector forming process.

1 Claim, 4 Drawing Figures

METHOD OF WELDING A ARC BATTERY INTERCELL CONNECTOR

BACKGROUND OF THE INVENTION

This invention relates to lead-acid storage batteries in which the individual cell groups are electrically series connected by intercell connectors formed through apertures in intercell partitions of the case housing the battery. More specifically, this invention relates to a method of forming a strong, low impedance intercell connector.

Through-the-partition intercell connections are used in batteries as a means for reducing IR losses within the battery, reducing the weight and cost of materials (i.e., lead) and improving the esthetics of the battery. A number of methods for making such connectors have been proposed over the years, but only a few of them have ever become a commercial reality. In this regard, Doyle et al U.S. Pat. No. 2,942,055, Miller U.S. Pat. No. 3,336,164, Sabatino et al U.S. Pat. No. 3,313,658, Matter U.S. Pat. No. 4,046,062 and variations thereof have all received some degree of commercial use. Doyle and Miller both involve mechanically upsetting a connector member extending through the aperture in the partition. Doyle upsets a discrete connector pin into sealing engagement with the aperture and subsequently fuses it to the plate strap lugs. In Miller, the connector is a male projection integral with one of the plate strap lugs. Miller's projection extends through the aperture, mates with a female plate strap lug on the cell group in the next adjacent cell and is mechanically upset into locking-sealing engagement with the female lug and the partition wall. Sabatino et al form their connector by resistance welding lug-integral projections together within the partition aperture. During welding, the lug faces move together into sealing engagement with the partition surrounding the aperture, and the softened projections deform to fill the aperture. Matter presses substantially flat-faced lugs tightly against the partition walls and thereafter, by means of opposing extruder-electrodes, extrudes portions of the lugs into contact with each other within the aperture. When the extrusions contact one another inside the aperture, the flowing current causes melting of the extrusions and softening of the surrounding material, and the pressure applied by the extruder-electrodes causes filling of the aperture with the extrudate.

Adams U.S. Pat. No. 3,589,948 confines flat plate strap lugs within molds located on opposite sides of the intercell aperture and then melts (e.g., by gas torch) down the tops of the lugs such that the melt flows together into the aperture. The application of heat such as to melt the tops of the lugs and cause them to flow together as suggested by Adams tends to overheat and distort thermoplastic (i.e., polypropylene) intercell partitions. This is especially true when heating is effected by gas torching the lug tops under conditions where the flame can directly contact the intercell partition.

It is an object of the present invention to provide an arc welding process for the precise manufacture of strong, low impedance intercell connections within the narrow confines of a lead-acid storage battery cell compartment without deleteriously overheating the intercell partition. This and other objects and advantages of the present invention will become more readily apparent from the detailed description thereof which follows.

BRIEF DESCRIPTION OF THE INVENTION

In accordance with the present invention, the battery cell groups are assembled in the battery case in a conventional manner and such that the upstanding lugs on the plate straps oppose each other on opposite sides of the aperture in the intercell partition. One of the lugs has a substantially flat face thereon and lies against the partition wall. The opposite lug has a cavity formed on its partition-abutting face and is positioned such that the cavity is substantially axially aligned with the aperture. To join the lugs through the aperture, the case is rotated 90° such that the flatfaced lug lies above the cavity-bearing lug. An electric arc (e.g., from a tungsten inert gas torch) is then struck between the upper lug and the torch so as to melt through only the central portion of the lug without melting the periphery thereof. The melt from the center of the lug flows by gravity through the aperture and into the cavity in the lower opposing lug. After solidification of the melt, the case is inverted and the backside center of the cavity-bearing lug is similarly arc-melted through to the cavity containing the solidified melt to perfect the bond between the two lugs. After cooling, the case is returned to the upright position and the lugs are cold pressed tightly together so as to sandwich the partition therebetween and form a fluid-tight intercell connection. Intercell connectors so made have displayed strengths (i.e., as measured by torque-to-rupture testing) greater than those normally obtained by a process such as disclosed by Matter (supra).

DETAILED DESCRIPTION OF THE INVENTION

Figure 1:
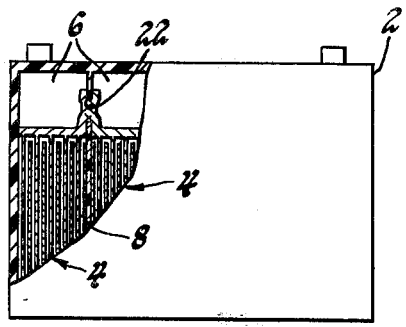
FIG. 1 is a partially sectioned, side elevational view of a multicell, lead-acid storage battery showing the general relationship existing between the cell groups, intercell partitions, plate strap lugs and intercell connectors.
Figure 2:
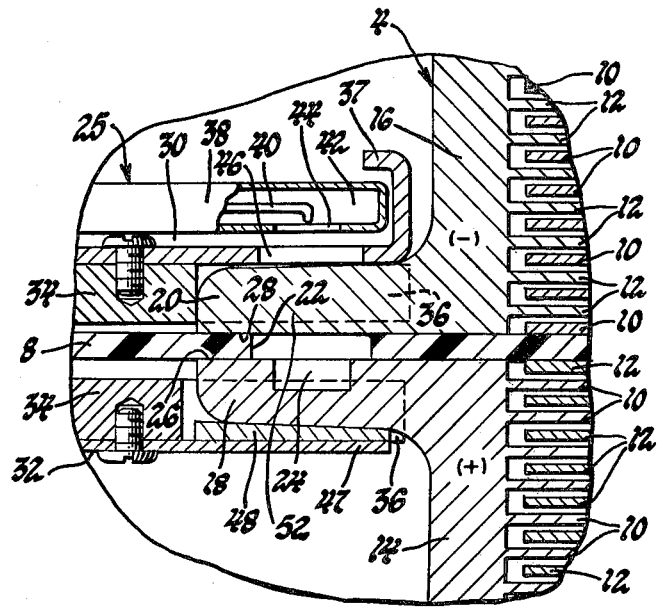
FIG. 2 is an enlarged, sectioned, side elevational view of the intercell connector zone with the cell groups, lugs and tooling in position prior to welding.
Figure 3:
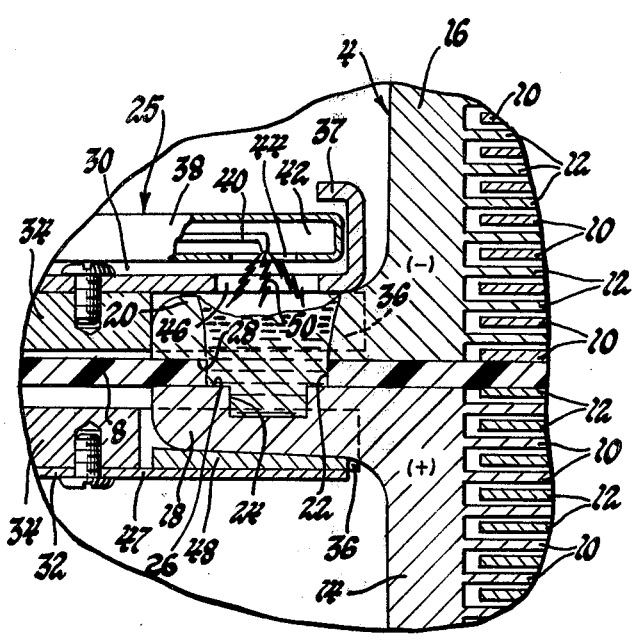
FIG. 3 is an enlarged, sectioned, side elevational view of the intercell connector zone depicting the initial welding step.
Figure 4:
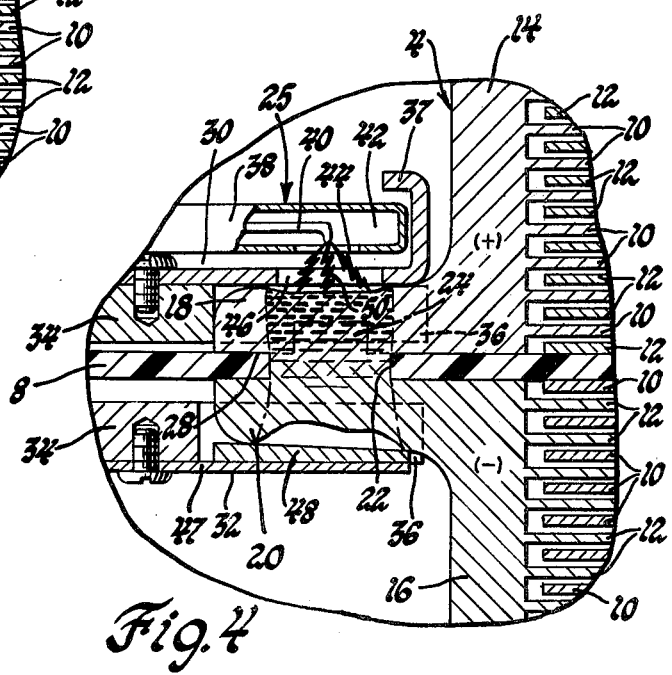
FIG. 4 is an enlarged, sectioned, side elevational view of the intercell connector zone depicting the final welding step.

FIG. 1 depicts a battery case 2 having a number of conventional, electrochemically active cell groups 4 positioned in the individual cell compartments 6. The cell compartments 6 are divided one from the other by means of intercell partitions 8. As best shown in FIGS. 2–4, each cell group 4 includes a plurality of individual positive plates 10 stacked alternately with individual negative plates 12 and separated from each other by microporous separators (not shown) as is well known in the art. The plates of like polarity within each group are electrically joined together by plate straps 14,16 according to conventional practice. The straps 14,16 are provided with upstanding lugs 18 and 20, respectively. During assembly, the positive plate strap lug of one group is joined through the aperture 22 in the partition 8 to the negative plate strap lug of the group in the next adjacent cell. In a typical lead-acid battery for SLI application, five such connections would connect six such cell groups in electrical series to yield a terminal voltage of 12 volts. The present invention relates specifically to the process for forming this intercell connection through the aperture 22 and the principal steps thereof are sequentially illustrated in FIGS. 2–4.

The cell groups 4 are placed in their respective compartments 6 such that the lugs 18,20 lie against the partition 8. The lugs 18,20 are sufficiently large (i.e., relative to the diameter of the aperture) as to completely close-off the aperture and lie against the partition surrounding the aperture 22. One of the plate strap lugs 18 has a cavity 24 formed in the partition-abutting face 26 thereof. The plate strap lug 20 on the opposite side of the partition 8 has a substantially flat face 28 on its partition-abutting side. After the groups are assembled in the case, the case is rotated 90° such that the cavity-bearing lug 18 lies beneath the flat-faced lug 20 (see FIGS. 2 and 3). A welding head 25 straddles the partition 8 and engages the lugs 18,20 in the manner illustrated. The head 25 principally includes a water-cooled welding leg 30 and a backup leg 32. The legs 30,32 each include a flat metal bar 34 having an inverted U-shaped lower end 36 generally conforming to the shape of the lugs 18,20 and adopted to receive the lugs 18,20 in the hollow thereof. A sheet metal bracket or mount 37 is affixed to the bar 34 and adopted to hold a tungsten inert gas (i.e., TIG) welding torch 38 in position so as to fire into the hollow of the U-shaped lower end 36 as shown. The bar 34 and bracket 37 are conductive and so sized as to contact the lug during welding to complete the electrical welding circuit with the torch 38 as well as cool the periphery of the lug during melting of its center. The torch 38 is a conventional TIG torch including a center electrode 40 and a conduit 42 for supplying the inert gas (e.g., argon). Appropriate openings 44 and 46 are provided in the torch 38 and bracket 37 to permit the forming of an arc directly between the center of the lug and the electrode 40. The backup leg 32 includes a backplate 47 for pressing the lug against the partition wall during welding. This plate 47 may be provided with a wedge-shaped pressure pad 48 which forces the lug 18 against the underside of the partition 8 as the fixture 30 slides over the lugs 18,20.

After positioning of the lugs and fixture, an arc 50 is struck between the nonconsumable electrode 40 and the center of the backside of the flat-faced lug 20 and melting commences. Melting continues until the central portion 52 of the lug 20 melts and flows by gravity through the aperture 22 into the cavity 24 of the lug 18. The very localized heating achievable with arc welding, coupled with the conductive cooling of the lugs' periphery by the water-cooled bar 34 causes melting to be confined to only the central portion of the lug 20 adjacent the aperture 22, and hence, no damaging heat is transmitted to the partition. When melt has filled the cavity 24 and aperture 22, the current is shut off and the weldment permitted to cool.

After the melt has solidified sufficiently, the welding head 25 is withdrawn and the battery inverted (i.e., turned 180°) such that the cavity-bearing lug 18 is now positioned above the previously melted lug 20. The welding head 25 is reinserted (see FIG. 4) and a new arc 50 struck and maintained sufficiently long to melt through the central portion of the lug 18 to fuse the center of lug 18 to the previously melted portion of the lug 20 in the cavity 24 (i.e., shown in phantom in FIG. 4).

Following welding, the welding head 26 is withdrawn, the battery returned to its upright position and the lugs squeezed tightly together by appropriate clamping means (not shown). This causes the faces of the lugs 18,20 to engage with the portions of the partition 8 surrounding the aperture 22 and at the same time cold upset the weldment in the aperture 22 resulting in a very strong, fluid-tight intercell connector having lower porosity than normally achievable with a process such as described by Matter (supra). In this regard, for example, production parts assembled according to the process of Matter (supra) having an aperture diameter of about 0.4 in. and a partition thickness of about 0.072 in. thickness displayed a conventional torque test (i.e., twisted apart in the plane of the partition) value of about 50 lb.-in. In contrast, connectors made in accordance with the present invention and with a lug cavity of 0.21 in. diameter displayed a torque test value of 69 lb.-in. for the same size partition and aperture.

While Applicants have described their invention primarily in terms of a single embodiment thereof, it is not intended that the scope of their invention be limited thereto but rather only to the extent defined hereinafter in the claim which follows.

I claim:

1. The process of assembling a multicell, lead-acid storage battery comprising the steps of:

forming a case having a plurality of partitions subdividing the case into a plurality of individual cell compartments, said partitions having apertures therein adapted to receive battery intercell connectors for electrically series interconnecting the several cells of the battery;

assembling a cell group for each of said compartments, said group comprising a stack of alternating positive and negative plates, a positive plate strap electrically joining the positive plates together, a negative plate strap electrically joining the negative plates together and upstanding lugs on said plate straps, wherein pairs of said lugs are adapted by fusion to electrically join the plate straps of adjacent groups through the apertures in the partitions and wherein one lug member of each lug pair has a substantially flat face on its partition-abutting side and the other lug member of each pair has a cavity formed in its partition-abutting side;

inserting said groups in said cell compartments such that the lugs of each pair overlie said aperture on opposite sides of said partition and so as to have said cavity in substantial axial alignment with said aperture;

orienting said case such that said other lug member lies beneath said one lug member and the partition positioned therebetween;

applying the arc of an inert-gas-shielded, nonconsumable-electrode, arc welding torch to the backside of said one lug member such as to fuse through substantially only the center of said lug member and to cause the melt therefrom to flow by gravity through said aperture into said cavity in sufficient quantity to substantially fill said cavity and said aperture;

inverting said previously oriented case and applying the arc of an inert-gas-shielded, nonconsumable-electrode, arc welding torch to the backside of said other lug member such as to fuse through substantially only the center thereof and weld it to the one lug material filling the cavity; and squeezing the lugs together to form a substantially fluid-tight intercell connector through said aperture.

* * * * *

UNITED STATES PATENT AND TRADEMARK OFFICE
CERTIFICATE OF CORRECTION

PATENT NO. : 4,177,551
DATED : December 11, 1979
INVENTOR(S) : George S. Johnson, Robey C. Reff It is certified that error appears in the above-identified patent and that said Letters Patent are hereby corrected as shown below:

In the Title (Title page and Column 1, line 1), "Method of Welding A Arc Battery" should read -- Method of Arc Welding A Battery --; and Column 4, line 21, "I claim:" should read -- The embodiments of the invention in which an exclusive property or privilege is claimed are defined as follows: --.

Signed and Sealed this

Twenty-seventh Day of January 1981

[SEAL]

*Attest:*

RENE D. TEGTMEYER

*Attesting Officer*  *Acting Commissioner of Patents and Trademarks*